United States Patent [19]
Arai et al.

[11] Patent Number: 5,013,474
[45] Date of Patent: May 7, 1991

[54] LIQUID CRYSTAL DISPLAY DEVICE

[75] Inventors: Kunihiko Arai; Tetsuo Urabe; Tetsuya Morita; Konoe Miura, all of Kanagawa; Tetsuo Ozawa, Tokyo; Junko Iwanami, Kanagawa, all of Japan

[73] Assignees: Sony Corporation, Tokyo; Mitsubishi Chemical Industries Limited, Kanagawa, both of Japan

[21] Appl. No.: 277,465

[22] Filed: Nov. 23, 1988

Related U.S. Application Data

[63] Continuation of Ser. No. 846,747, Apr. 1, 1986, abandoned.

[30] Foreign Application Priority Data

Apr. 2, 1985 [JP] Japan ................... 60-69560

[51] Int. Cl.$^5$ .............................................. C09K 19/00
[52] U.S. Cl. .................... 252/299.1; 350/349; 350/350 S; 350/351
[58] Field of Search ............... 252/299.1; 350/349, 350/350, 351; 430/20

[56]  References Cited

U.S. PATENT DOCUMENTS

| | | | |
|---|---|---|---|
| 4,464,282 | 8/1984 | Harrison et al. | 262/299.1 |
| 4,496,221 | 1/1985 | Harrison et al. | 252/299.1 |
| 4,548,886 | 10/1985 | Katagiri et al. | 430/70 |
| 4,606,613 | 8/1986 | Urabe | 350/399 |

FOREIGN PATENT DOCUMENTS

| | | | |
|---|---|---|---|
| 153729 | 9/1985 | European Pat. Off. | 252/299.1 |
| 187015 | 7/1986 | European Pat. Off. | 252/299.1 |

OTHER PUBLICATIONS

Loutfy et al., Photographic Science & Eng., vol. 27, No. 1, pp. 5-9 (1983).
Cox, Mole. Cryst. Liq. Cryst., vol. 55, pp. 1-32 (1979).

Primary Examiner—Robert L. Stoll
Assistant Examiner—Richard Treanor
Attorney, Agent, or Firm—Hill, Van Santen, Steadman & Simpson

[57] ABSTRACT

A liquid crystal display device of the type in which thermo-writing is performed by means of irradiation of laser beams, the display device including a laser-sensitive liquid crystal composition exhibiting a maximum absorption at or near the wavelength of the impinging laser beam with which the display device is to be used. The specific improvement of the present invention comprises including in the liquid crystal composition at least two types of laser-responsive dyes, each being present in an amount less than its solubility limit in the liquid crystal composition, and each of the dyes evidencing a maximum absorption at or near the wavelength of the laser beam. In an embodiment, the dyes are chosen from the class of squarilium dyes.

3 Claims, 4 Drawing Sheets

LIQUID CRYSTAL DISPLAY DEVICE

This is a continuation of application Ser. No. 846,747, filed Apr. 1, 1986, now abandoned.

BACKGROUND OF THE INVENTION

1. Field of the Invention

The present invention is in the field of liquid crystal display devices and liquid crystal compositions which are responsive to irradiation by laser beams to produce thermowriting.

2. Description of the Prior Art

There are in the prior art liquid crystal display devices including the so-called static image liquid crystal display device of high resolution, in which laser beams modulated by a signal based on an optical image to be displayed, e.g., a video signal, are irradiated onto a liquid crystal cell to thereby write the optical image to be displayed into the liquid crystal cell. Thereafter, light is irradiated onto the liquid crystal cell to project the optical image onto a screen. Specifically, the liquid crystal in such a display device exists, for example, in the smectic phase normally and undergoes phase transition into the nematic phase and later into the liquid phase upon irradiation by the laser beams, due to the effect of heat. When the heated portion of the liquid crystal is quenched after the irradiation by the laser beams, the molecules of that portion do not revert to their unidirectional orientation but form a disturbed texture such as the so-called focal conics and the like, and image writing is conducted utilizing this texture which intensely scatters light. The written image can be erased by restoring the texture to the smectic phase in which the molecules are oriented unidirectionally as in its initial state by the application of an external electric field.

The light scattering texture formed by the heating effect of the laser beam irradiation is maintained without destruction so that the image is preserved, that is, memorized, unless an external electric field is applied or a high external temperature is again applied.

In such a liquid crystal display device, it is necessary for actual image display that the rewriting for the static image be made rapidly. To enable rapid rewriting, it is required that the heat conversion efficiency be increased by efficient light absorption of the writing laser beams in the liquid cell. In view of the above, it has been proposed that a liquid display device of this kind should incorporate a dye having a high light absorbance for the wavelength of the writing laser beams such as semiconductor laser beams, for example, at 780 nm.

As disclosed, for example, in Japanese Laid-Open Patent Specification No. 197485/1984 textures causing the scattering of light upon writing by taking a vertically oriented mode, i.e., the focal conic textures, are formed as small-diameter spots in the liquid crystal and the dye added thereto in a liquid crystal cell, so as to obtain a higher resolution power and to improve the absorbance of light energy due to the addition of the dye.

As described above, it has been proposed to add a dye into the liquid crystal of a liquid crystal display device. A squarylium type dye, for example, NK-2772 (trademark of a product manufactured by Nippon Kanko Shikiso Institute), is mixed with about 0.35% by weight of the dye (referring to Japanese Patent Laid-Open Specification No. 197485/1984). In this case, as the concentration of the dye in the liquid crystal is increased, the entire absorbance for the laser beams can be improved and the light-to-heat conversion efficiency can be enhanced to improve the writing velocity. However, it is actually necessary to limit the amount of dye added to the liquid crystal to less than the level corresponding to the solubility limit of the dye in the liquid crystal in order to avoid deposition thereof. Accordingly, the dye cannot be added in an amount sufficient to satisfy the object of the addition. For example, in the case of the NK-2772 dye described above, the upper limit of addition is 0.4% by weight for the working temperature of the liquid crystal ranging from the temperature for the formation of the smectic phase and that for the liquid phase. In the liquid crystal cell, a bias temperature of about 53° to 54° C. is applied so that the phase transition may be achieved at a low writing power. However, if the display device is left in its nonoperational state at a temperature lower than the bias temperature, such as room temperature, the dye may possibly be deposited out of solution. Thus, the the amount of dye added is further limited to about 0.35% by weight.

Consequently, the added amount of dye cannot be increased enough in view of the restriction of its solubility in the liquid crystal.

SUMMARY OF THE INVENTION

The present invention seeks to overcome the foregoing problems of the prior art and provide a liquid crystal display device capable of improving the writing velocity by sufficiently increasing the total concentration of dyes, thereby increasing the absorbance for the lighting laser beam such as a semiconductor laser beam.

The present inventors have found that although the amount of dye added to the liquid crystal in a liquid crystal display device for enhancing the absorbance of laser beams is restricted by the solubility of the dye in the liquid crystal, the solubility for each of several individual dyes is substantially independent of each other and the total solubility of the respective dyes if added together each at an amount less than the maximum solubility for each dye, becomes approximately the sum of the solubilities for the respective dyes.

Thus, the present invention has achieved its objective by providing a liquid crystal display device in which thermowriting is conducted by irradiation of laser beams and wherein two or more kinds of dyes each having a maximum absorbance at or near the wavelength from the visible red to near infrared region of the oscillation wavelength of the writing laser beam and evidencing a high absorption effect for the wavelength of the writing laser beams are added to the liquid crystal.

Dyes suitable for use in this invention include squarylium type dyes and chroconium type dyes. Preferably, two or more squarylium type dyes represented by the following general formula (I) are included in the liquid crystal:

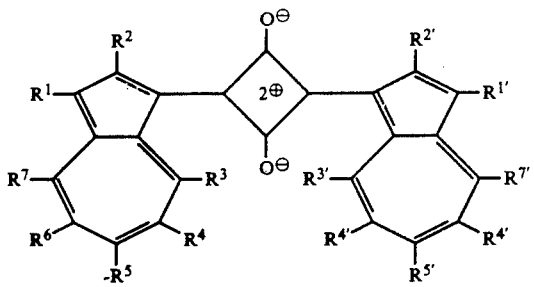

[I]

wherein $R^1$-$R^7$ and $R^{1'}$-$R^{7'}$ each represent a hydrogen atom or alkyl group containing 1 to 13 carbon atoms. The squarylium type dyes can be synthesized by known methods, for example, by the method described in Angewandte Chemie, Volume 78, No. 20, page 937 (1966).

More preferably, two or more of the squarylium dyes represented by the following general formulas Ia-Id can be dissolved in the liquid crystal:

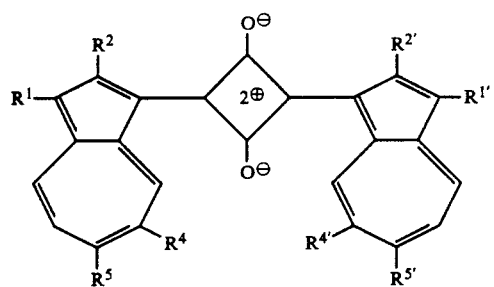

[Ia]

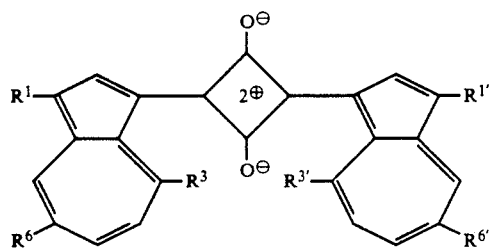

[Ib]

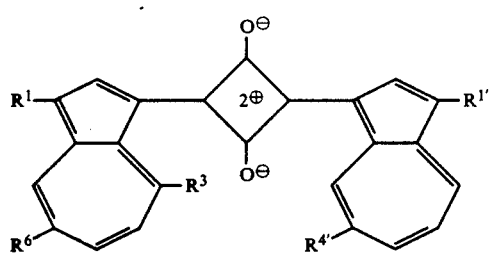

[Ic]

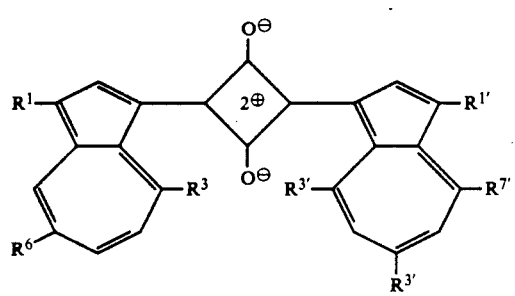

[Id]

where $R^1$-$R^7$ and $R^{1'}$-$R^{7'}$ each represent a hydrogen atom or alkyl group containing 1 to 13 carbon atoms.

As a more specific combination, the joint addition of compounds of the following formula (II) and (III) are preferred:

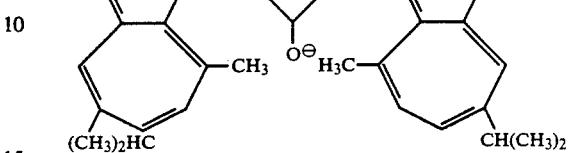

[II]

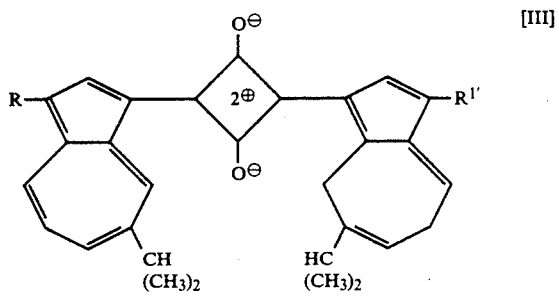

[III]

where R and R' each represents a hydrogen atom or alkyl group containing 1 to 13 carbon atoms.

While the ratio of dyes may vary considerably, the amount of the dyes dissolved in the liquid crystal is usually within the range of from 0.05 to 5% by weight of the total amount of liquid crystal composition.

Smectic liquid crystals or the like can be employed as the liquid crystal material. The smectic liquid crystals usable herein include, for example, biphenyl type liquid crystals, terphenyl liquid crystals, cyclohexyl cyclohexane liquid crystals, cyclohexylphenyl liquid crystals, biphenylcyclohexane liquid crystals, cyclohexylbiphenyl cyclohexane liquid crystals, phenylcyclohexyl carboxylate liquid crystals, cyclohexyl cyclohexyl benzoate liquid crystals, cyclohexyl phenylcyclohexyl carboxylate liquid crystals, cyclohexyl cyclohexyl cyclohexyl carboxylate liquid crystals and pyrimidine type liquid crystals, either alone or in admixture.

In the liquid crystal display device according to the present invention as described above, since a plurality of kinds of dyes is added to the liquid crystal each by an amount less than the solubility limit for each, the amount of dyes added to the liquid crystal is significantly increased, whereby the writing laser beams can be absorbed more efficiently, thereby reducing the laser power and improving the writing velocity.

BRIEF DESCRIPTION OF THE DRAWINGS

Other objects, features and advantages of the present invention will become apparent in the following description of the examples of the present invention, taken in conjunction with the appended drawings in which.

DESCRIPTION OF THE PREFERRED EMBODIMENTS

Figure 1:
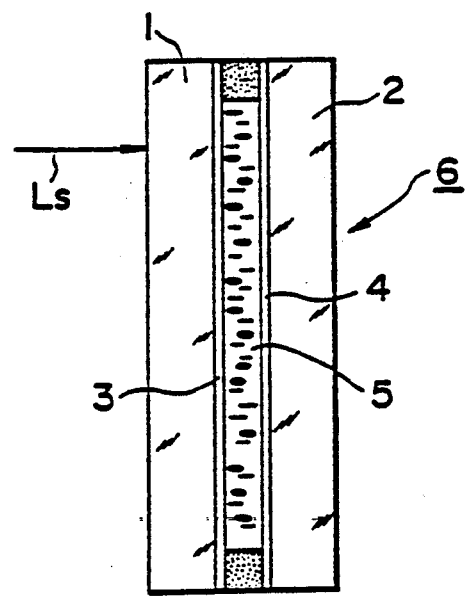
FIG. 1 is a schematic cross-sectional view of a liquid crystal display device according to this invention.

The invention will be described by way of preferred embodiments, while referring to FIG. 1.

In this invention, a liquid crystal layer 5 is incorporated with two or more dyes and is disposed between two transparent electrodes 3 and 4 forming the inner sides of two opposed transparent substrates, for example, glass substrates 1 and 2, to form a liquid crystal cell 6.

In this case, a cyanobiphenyl type liquid crystal was used comprising the following composition:

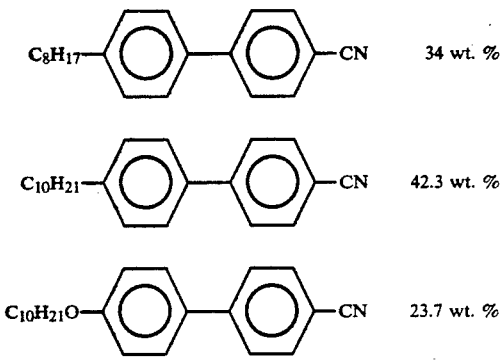

Then, two types of dyes were added. For example, 0.24% by weight of NK-2772 of the following structural formula (1) was added as the first dye and 0.26% by weight of a dye having the structural formula (2) were employed:

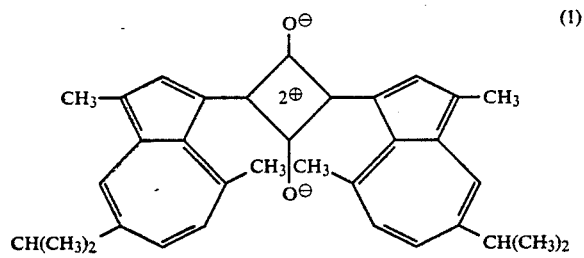

(1,3-di(1,4-dimethyl-7-isopropyl azulenyl)-cyclobuten diylium)

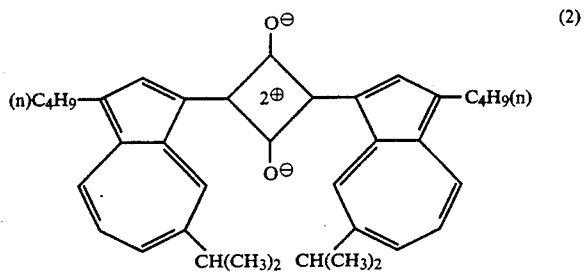

Figure 2:
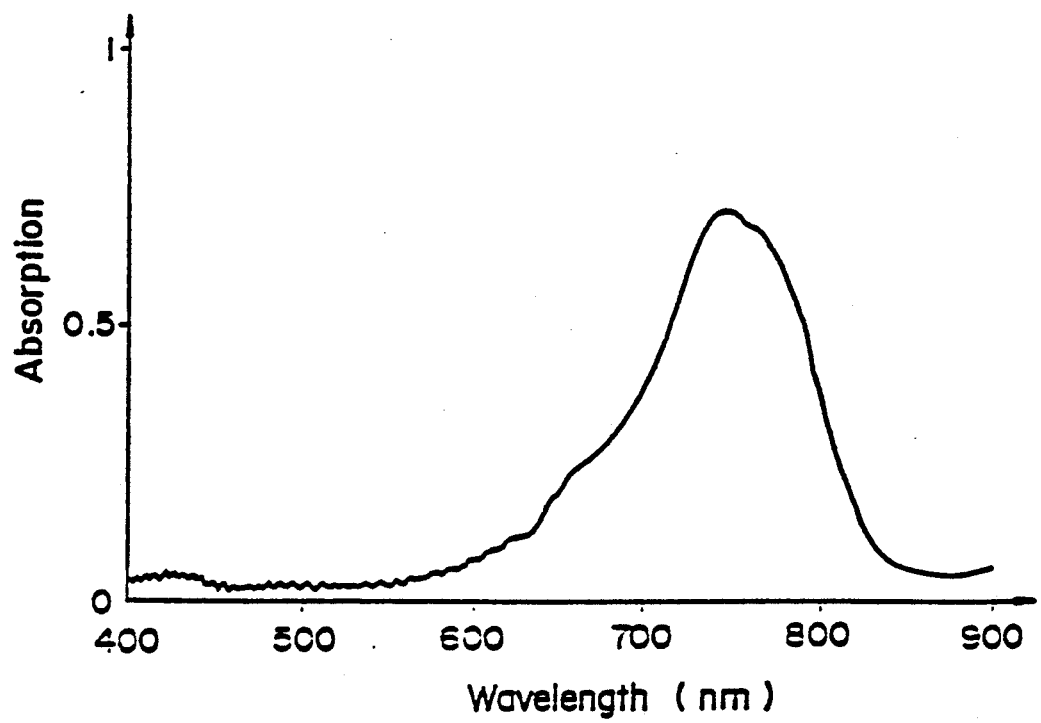
FIGS. 2 through 4 are light absorbance spectrum charts.
Figure 3:
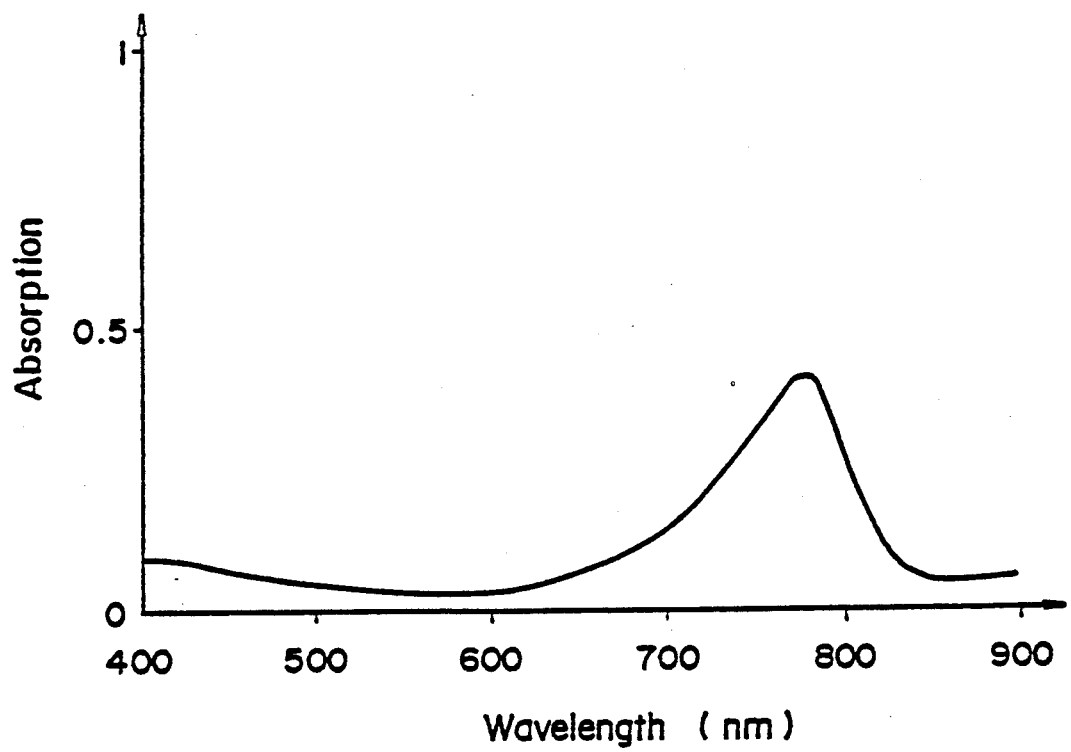
Figure 4:
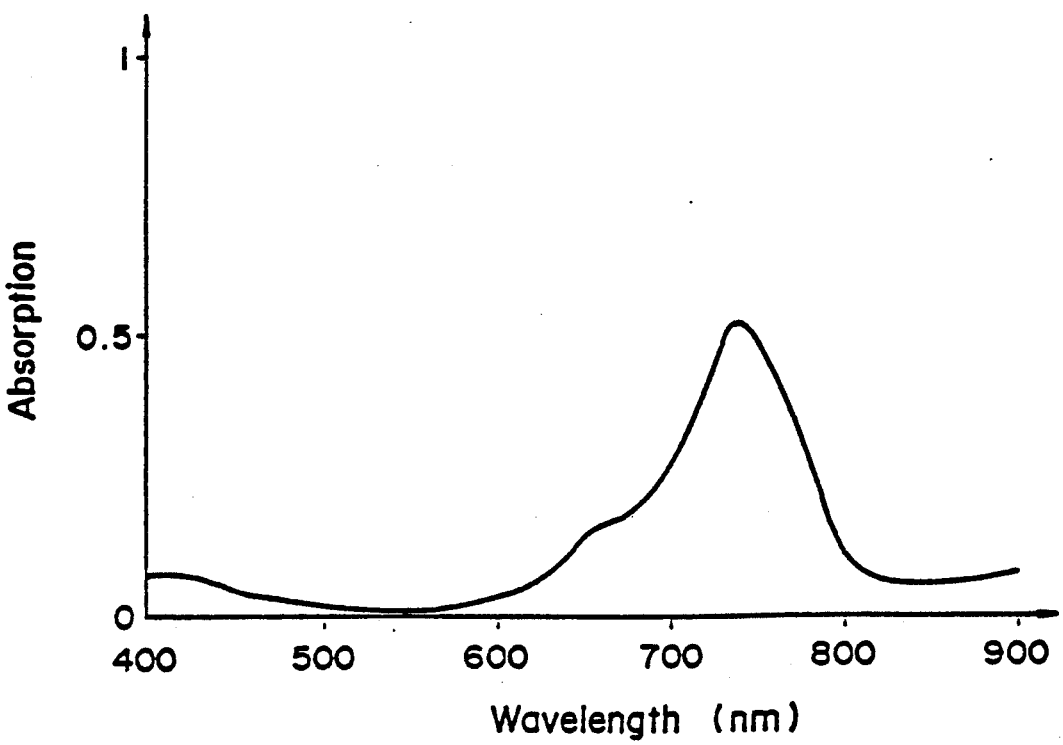

FIG. 2 is an absorption spectrum chart obtained with the composition as described above. FIG. 3 is an absorption spectrum chart in which only NK-2772 was added in an amount of 0.28% by weight in the liquid crystal. FIG. 4 is a spectrum chart in which only the dye with the structural formula (2) was added in an amount of 0.30% by weight in the liquid crystal. As apparent from the comparison of these charts, a significantly higher absorbance is shown for the light-emitting wavelength of semiconductor laser beams, for example, 780 nm according to the present invention as compared with the addition of each dye individually.

Figure 5:
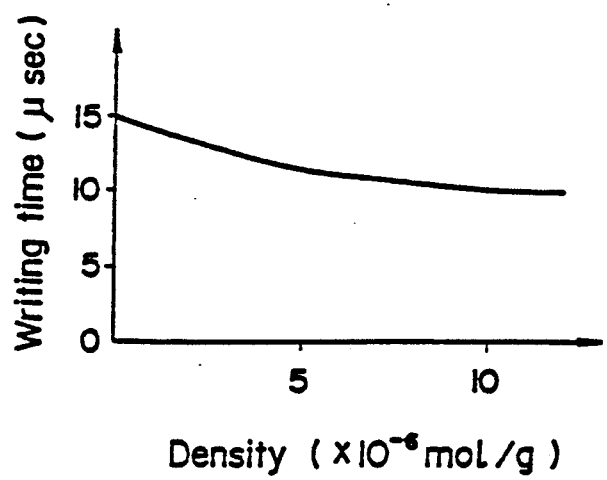
FIG. 5 is a graph showing the relation of writing time to density of the liquid crystal material.

FIG. 5 refers to the writing velocity in the case where the concentration of the dye NK-2772 in the liquid crystal was maintained constant at 0.29% by weight, and the concentration of the other dye was varied from 0 to 0.60% by weight. In that case, it will be seen that the writing time can be shortened as the concentration increases. It will be understood that the writing velocity is improved as compared with the case of the liquid crystal cell using the dye NK-2772 alone.

EXAMPLES 2–11

Squarylium dyes as shown in the following Table 1 were added and dissolved to the liquid crystal as described in Example 1. An evaluation of the results showed that a better writing speed could be obtained in any of the cases as compared with the case of adding the dye NK-2772 alone by an amount of 0.29% by weight.

TABLE 1

| Example No. | Squarylium dye (% by weight) | |
| --- | --- | --- |
| 2 | 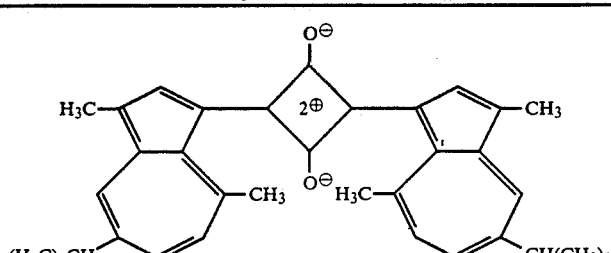 | (0.29) |

TABLE 1-continued

| Example No. | Squarylium dye (% by weight) | |
|---|---|---|
| | [structure: bis-azulenyl squarylium with (n)C₃H₇ and CH(CH₃)₂ substituents] | (0.30) |
| 3 | [structure: bis-azulenyl squarylium with CH₃ and CH(CH₃)₂ substituents] | (0.29) |
| | [structure: bis-azulenyl squarylium with (n)C₅H₁₁ and CH(CH₃)₂ substituents] | (0.32) |
| 4 | [structure: bis-azulenyl squarylium with CH₃ and CH(CH₃)₂ substituents] | (0.29) |
| | [structure: bis-azulenyl squarylium with (n)C₈H₁₇ and CH(CH₃)₂ substituents] | (0.29) |
| 5 | [structure: bis-azulenyl squarylium with CH₃ and CH(CH₃)₂ substituents] | (0.29) |

TABLE 1-continued

| Example No. | Squarylium dye (% by weight) | |
|---|---|---|
| | [structure: squarylium dye with two azulene groups, each bearing C2H5 and CH(CH3)2 substituents] | (0.30) |
| 6 | [structure: squarylium dye with two azulene groups, each bearing CH3, CH3, and CH(CH3)2 substituents] | (0.29) |
| | [structure: squarylium dye with two azulene groups, each bearing C2H5, CH3, and CH(CH3)2 substituents] | (0.32) |
| 7 | [structure: squarylium dye with two azulene groups, each bearing CH3, CH3, and CH(CH3)2 substituents] | (0.29) |
| | [structure: squarylium dye with two azulene groups, bearing CH3/CH(CH3)2 and C4H9(n)/CH(CH3)2 substituents] | (0.30) |
| 8 | [structure: squarylium dye with two azulene groups, each bearing CH3, CH3, and CH(CH3)2 substituents] | (0.29) |

TABLE 1-continued
| Example No. | Squarylium dye (% by weight) | |
|---|---|---|
| | 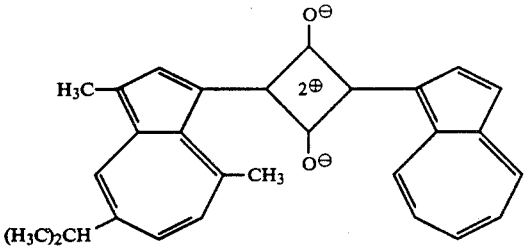 | (0.31) |
| 9 | 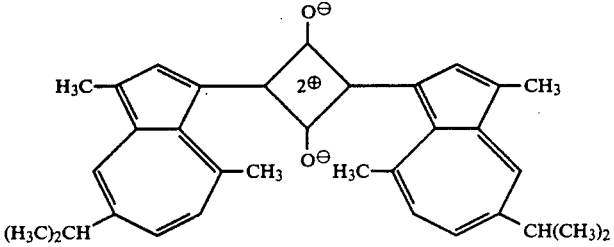 | (0.29) |
| | 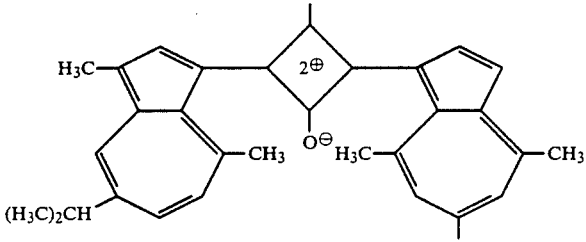 | (0.28) |
| 10 | 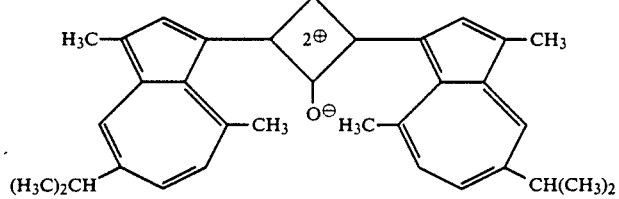 | (0.29) |
| | 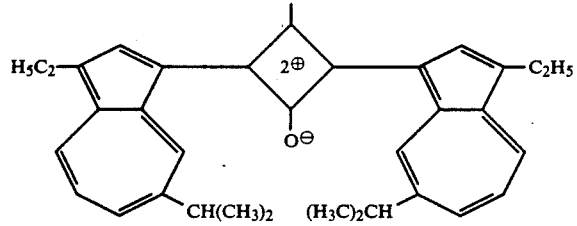 | (0.20) |
| | 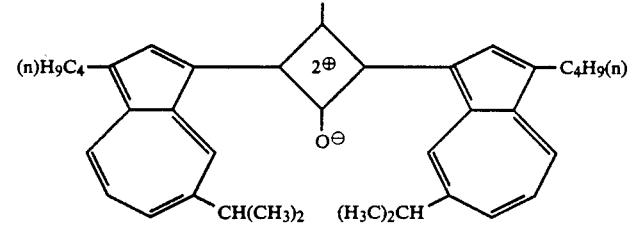 | (0.20) |

TABLE 1-continued

| Example No. | Squarylium dye (% by weight) | |
|---|---|---|
| 11 | [structure: bis-azulenyl squarylium with H3C-, -CH3, -CH3, H3C-, (H3C)2CH-, -CH(CH3)2 substituents] | (0.29) |
| | [structure: bis-azulenyl squarylium with (n)H7C3-, -C3H7(n), -CH(CH3)2, (H3C)2CH- substituents] | (0.21) |
| | [structure: bis-azulenyl squarylium with H5C2-, -C2H5, -CH(CH3)2, -CH(CH3)2 substituents] | (0.19) |

EXAMPLES 12–17

Squarylium dyes as shown in the following Table 2 were added and dissolved to the liquid crystals as described in Example 1. As a result of evaluation, it was found that better writing velocity was obtained in any of the cases as compared with the case of adding only the dye represented by structural formula (2) in Example 1 in an amount of 0.30% by weight.

TABLE 2

| Example No. | Squalilium dye (% by weight) | |
|---|---|---|
| 12 | [structure: bis-azulenyl squarylium with (n)H9C4-, -C4H9(n), -CH(CH3)2, (H3C)2CH- substituents] | (0.30) |
| | [structure: bis-azulenyl squarylium with (n)H7C3-, -C3H7(n), -CH(CH3)2, (H3C)2CH- substituents] | (0.31) |

TABLE 2-continued

| Example No. | Squalilium dye (% by weight) |
|---|---|
| 13 | [structure with (n)H$_9$C$_4$ and C$_4$H$_9$(n) substituents on azulene rings, CH(CH$_3$)$_2$ and (H$_3$C)$_2$CH groups] (0.30) |
| | [structure with (n)H$_{11}$C$_5$ and C$_5$H$_{11}$(n) substituents on azulene rings, CH(CH$_3$)$_2$ and (H$_3$C)$_2$CH groups] (0.28) |
| 14 | [structure with (n)H$_9$C$_4$ and C$_4$H$_9$(n) substituents on azulene rings, CH(CH$_3$)$_2$ and (H$_3$C)$_2$CH groups] (0.30) |
| | [structure with H$_5$C$_2$ and C$_2$H$_5$ substituents on azulene rings, CH(CH$_3$)$_2$ groups] (0.27) |
| 15 | [structure with (n)H$_9$C$_4$ and C$_4$H$_9$(n) substituents on azulene rings, CH(CH$_3$)$_2$ and (H$_3$C)$_2$CH groups] (0.30) |
| | [structure with C$_2$H$_5$, H$_3$C, CH$_3$, C$_2$H$_5$ substituents on azulene rings, CH(CH$_3$)$_2$ and (H$_3$C)$_2$CH groups] (0.30) |

TABLE 2-continued

| Example No. | Squalilium dye (% by weight) |
|---|---|
| 16 | (0.30) |
| | (0.29) |
| 17 | (0.30) |
| | (0.15) |
| | (0.15) |

As described above, since the added amount of dyes in the liquid crystal can be increased, thereby increasing the absorbance of the writing light, the writing velocity can be increased and the power used for the writing light can be reduced.

In the conventional method of using an organic dichromic dye dissolved in a liquid crystal as the laser beam absorbing material, there is a problem in that the dye is degraded due to projection light, particularly by the ultraviolet region thereof. It has been found that the composite dye system of the present invention minimizes the degradation effect in the dye due to ultraviolet irradiation.

Figure 6:
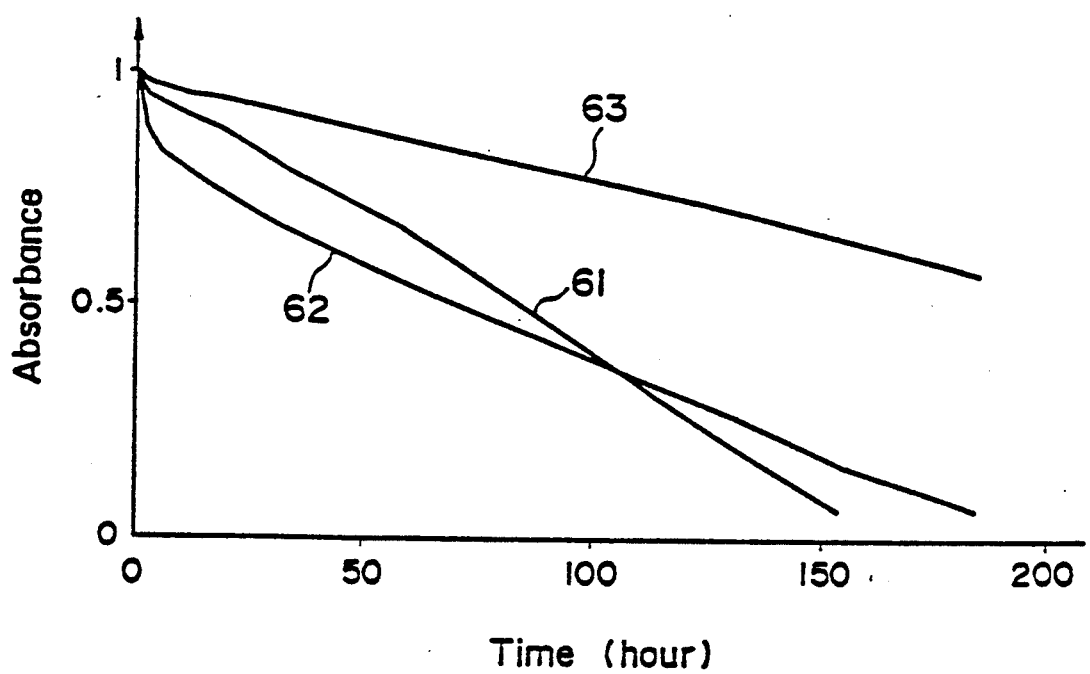
FIG. 6 is a characteristic chart plotting absorbance versus time for ultraviolet ray degradation.

FIG. 6 illustrates the ultraviolet ray degradation characteristics for each of several specimens prepared by dissolving the dyes respectively into a mixed nematic liquid crystal "CR-31" (produced by Chisso Co.) and putting the liquid crystal in a horizontally oriented cell so that the liquid crystal layer had a thickness of 12 microns. Curve 61 shows the effect of adding 0.3% by weight of the dye with the structural formula (1), curve 62 shows the effect of adding 0.3% by weight of the dye with the structural formula (2) and curve 63 shows the effect of adding 0.3% by weight of each of the two dyes having structural formulas (1) and (2). The ordinate in the graph shows the absorbance at 780 nm before the ultraviolet ray irradiation in a relative amount. The ultraviolet ray source used was a 200 watt black light (360 nm max). The specimen represented by curve 63 showed a highly resistant property toward ultraviolet which is more than twice that compared when using individual dyes, represented by the curves 61 and 62.

Figure 7:
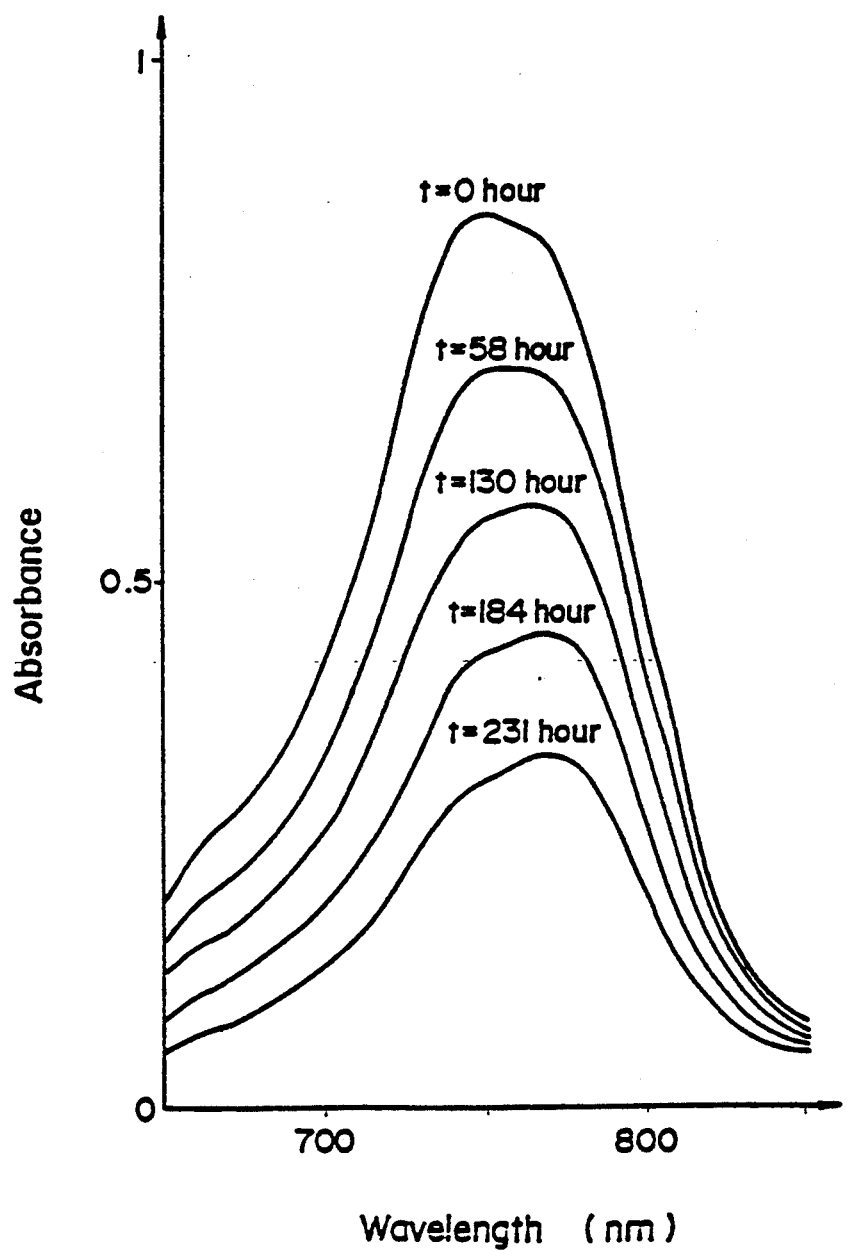
FIG. 7 is a graph illustrating the change in absorption spectrum relative to ultraviolet ray irradiation time.

FIG. 7 illustrates the change in absorption spectrum for the specimen represented by the curve 63 in relation to the ultraviolet ray irradiation time. The degradation caused by the ultraviolet rays can be seen from the fact that the maximum absorption shifts from a wavelength near 750 nm to a wavelength near 770 nm in FIG. 7. This shows that the dye of structural formula (2) degrades more rapidly than the dye of structural formula (1) in the composite dye system. While it has not yet been determined why the ultraviolet ray degradation characteristic in the composite system can be improved as compared with those of individual dyes, it may be that the dyes function with each other as deactivators.

It will be understood that various modifications can be made to the described embodiments without departing from the scope of the present invention.

We claim as our invention:

1. A liquid crystal display device comprising:
   a liquid crystal cell comprising opposed transparent electrode plates,
   a liquid crystal layer including a smectic liquid crystal composition confined between said electrode plates,
   a laser beam source positioned to emit a laser beam at said liquid crystal layer, said laser beam emitting a range of wavelengths including the range of visible red to infrared,
   said smectic liquid crystal composition containing at least two distinct squarylium dyes represented by the following general formula:

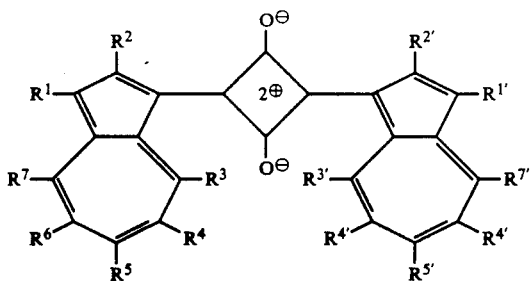

where $R^1$ to $R^7$ and $R^{1'}$ to $R^{7'}$ each represents a hydrogen atom or an alkyl group of from 1 to 13 carbon atoms, each being present in an amount less than its solubility limit in said liquid crystal composition, all of said dyes evidencing a maximum absorption in said range of wavelengths emitted by said laser beam, and the dyes being present in an amount between approximately 0.05 to about 5 percent by weight of the total amount of the liquid crystal composition.

2. A liquid crystal display device according to claim 1 said composition containing at least two squarylium type dyes represented by the following general formulas:

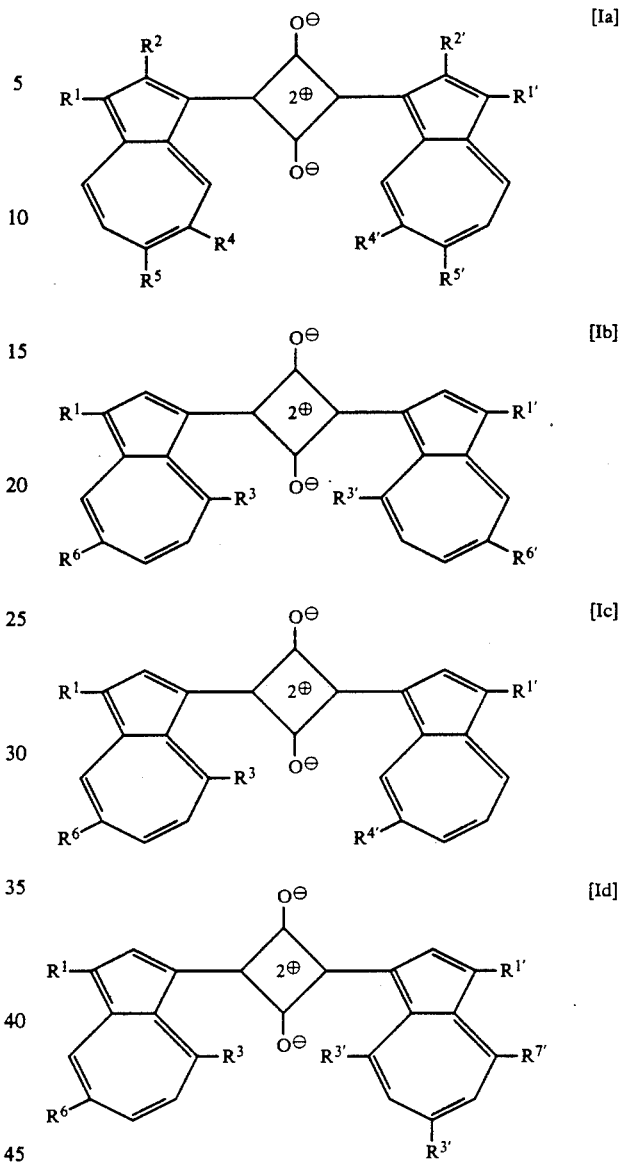

where $R^1$ to $R^6$ and $R^{1'}$ to $R^{7'}$ each represents a hydrogen atom or an alkyl group of 1 to 13 carbon atoms, the substitution being such that the dyes are distinct from each other.

3. A liquid crystal display device according to claim 1 said composition containing the following two squarylium type dyes represented by the following general formulas:

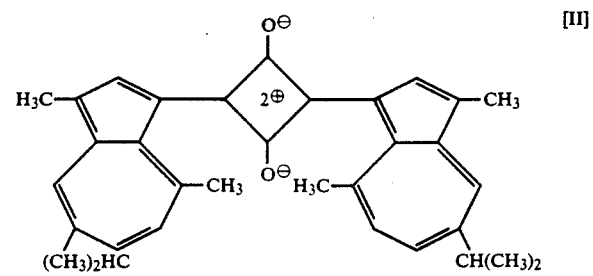

-continued
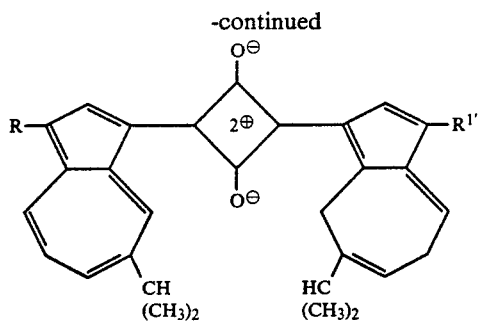
[III]
where R and R[1] each represents a hydrogen atom or an alkyl group of 1 to 13 carbon atoms.
* * * * *